Dec. 24, 1946.  H. S. OGDEN  2,413,190
ANTISLIPPAGE SYSTEM FOR PLURAL TRACTION MOTORS
Filed Dec. 20, 1944
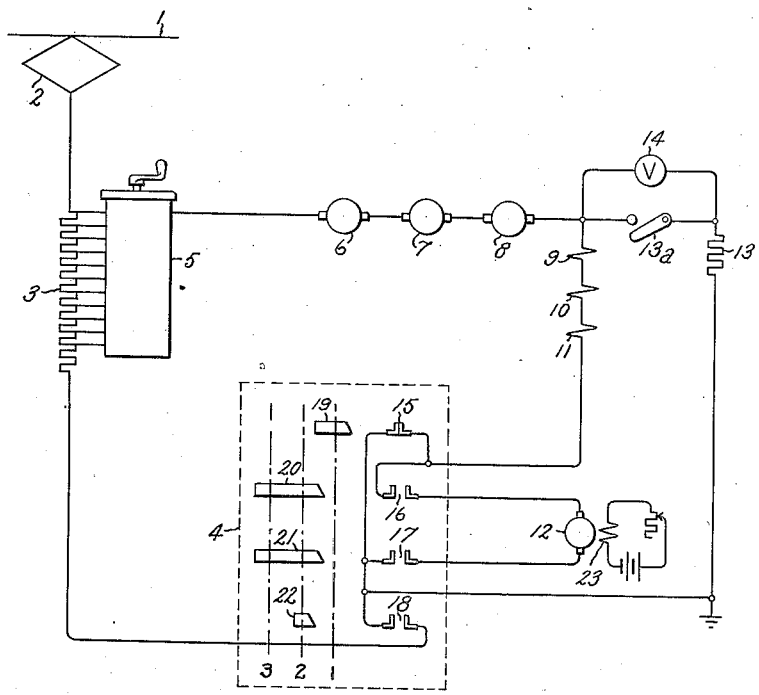
Inventor:
Harold S. Ogden,
by Harry E. Dunham
His Attorney.

Patented Dec. 24, 1946

2,413,190

UNITED STATES PATENT OFFICE 2,413,190

ANTISLIPPAGE SYSTEM FOR PLURAL TRACTION MOTORS

Harold S. Ogden, Erie, Pa., assignor to General Electric Company, a corporation of New York Application December 20, 1944, Serial No. 568,965

17 Claims. (Cl. 172—179)

My invention relates to electric motor control systems, and more particularly to systems for controlling acceleration and braking of direct current electric traction motors.

It is a general object of my invention to provide a new and improved accelerating and braking system for direct current electric traction motors.

It is a further object of my invention to provide a new and improved direct current electric traction motor control system for preventing slippage of the driving wheels in an electrically propelled vehicle.

It is still another object of my invention to provide a new and improved anti-slip accelerating connection for direct current electric traction motors.

Another object of my invention is the provision of a new and improved regenerative braking system for direct current electric traction motors.

It is a more specific object of the invention to provide, in a direct current electric traction motor control system, a regenerative braking connection which may be utilized to accelerate the motors without danger of wheel slippage.

Briefly, my invention comprises a variable potentiometer connected across a substantially constant voltage unidirectional current supply source, one or more direct current traction motors of the series field type connected to a variable tap of the potentiometer with their field windings and armatures coupled in series circuit relation and supplementary field exciting means comprising a variable voltage source of current supply connected to supply current to the motor field windings through a low resistance stabilizing resistor. The potentiometer is proportioned to have a low percentage regulation between no load and full load, so that a relatively "stiff" voltage is supplied to the motors. A running connection is provided through switching means arranged to disable the supplementary field exciting means and to connect the potentiometer in series with the motors as a variable resistor when desired.

My invention will be more fully understood and its various objects and advantages further appreciated by referring now to the following detailed specification taken in conjunction with the accompanying drawing, the single figure of which is a schematic circuit diagram of an electric traction motor control system embodying my invention.

Referring now to the drawing, I have shown a substantially constant voltage source of unidirectional current supply, such as an overhead line 1, connected through a pantograph 2 to one terminal of a variable resistor 3. As will appear hereinafter, the opposite terminal of the resistor 3 may be connected through a manually operable controller 4 either to ground to connect the resistor 3 as a variable potentiometer, or may be left open-circuited to connect the resistor 3 as a variable resistor in series in the motor circuit. The resistor 3 is provided with a plurality of taps, to any one of which connection may be made by a manually operable controller 5. The controller 5 includes a main line breaker (not shown) which is open only in the "off" position of the controller.

The selected tap of the resistor 3 is connected through the controller 5 to a plurality of electric traction motors having armatures 6, 7 and 8 and series field windings 9, 10 and 11, respectively. The motor armatures 6, 7 and 8 and motor field windings 9, 10 and 11 are each connected, respectively, in series circuit relation, and the field windings are coupled in series relation with the armatures between the selected tap on the resistor 3 and ground. The ground connection of the motors is made through the controller 4. As will be more fully explained hereinafter, the field windings are connected directly to ground in one position of the controller 4 and in certain other positions the field windings are connected to ground through a variable voltage field exciting generator 12 having its output terminals connected so that its voltage opposes the voltage impressed upon the motors from the supply source 1.

To complete a supplementary field excitation circuit for the series field windings 9, 10 and 11 when the exciter 12 is connected in circuit, I provide a low resistance stabilizing resistor 13 which may, when desired, be connected through a contactor 13A across the exciter 12 and the series field windings 9, 10 and 11. The resistance of the stabilizing resistor 13 is preferably less than the sum of the resistances of the series field windings 9, 10 and 11. For a purpose which will be more fully explained hereinafter, a voltmeter 14 is connected across the terminals of the switch 13.

The controller 4 comprises a plurality of pairs of separable contacts 15, 16, 17 and 18 and a plurality of operating cams 19, 20, 21 and 22 associated with the respective pairs of contacts. The controller has three positions indicated in dotted lines upon the drawing, and is shown in its first position with the contacts 15 closed and the remaining contacts open. The contacts 15 are connected directly between the field winding 11 and ground and are closed only in the first position of the controller. The contacts 16 are connected between the field winding 11 and one terminal of the exciter 12 and the contacts 17 are connected between the opposite terminal of the exciter 12 and ground. The contacts 16 and 17 are closed in the second and third controller positions. The contacts 18 are connected between the lower terminal of the variable resistor 3 and ground and are closed only in the second controller position. It will be noted that the operating cams 19, 20, 21 and 22 are so arranged that, in moving from the first position to the second position of the controller, the contacts 16 and 17 are closed before the contacts 15 are opened. The contacts 18 are closed simultaneously with the opening of the contacts 15.

The traction motor connections described briefly above provide a versatile control system, the operation of which will be understood from the following brief description. Let it first be assumed that the vehicle is at rest and that the controller 4 is in its first position with the contacts 15 closed as shown. If now the handle of the controller 5 is moved from its off position, the traction motor armatures are connected to the lowest tap of the resistor 3 and the resistor 3 is connected in series circuit relation with the traction motor armatures and field windings between the pantograph 2 and ground. This is a conventional series resistor accelerating connection, and, if desired, the motors may be accelerated by merely gradually reducing the portion of the resistance 3 in series with the motors.

The motors may also be accelerated in the second position of the controller 4. In this controller position connections are made providing for regenerative braking and protection of the motors against slipping during acceleration. To illustrate the operation of the system in this connection, let it be assumed that the vehicle is at rest and that the controller 4 is placed in its second position with the main switch in the controller 5 open. In the second position of the controller 4 the resistor 3 is connected as a potentiometer between the overhead line 1 and ground, and the traction motors are connected between the variable tap on the resistor and ground through the armature of the exciter 12. If now the controller 5 is moved from its "off" position, voltage is applied to the motors from the lowest tap of the potentiometer resistance 3 and the motors will begin to accelerate. In order to complete the anti-slip connection, field excitation is now applied to the exciter 12, as by a separately excited field winding 23, and its voltage increased until both terminals of the switch 13A are brought to the same potential, as indicated upon the voltmeter 14. At this time the switch 13A is closed, either manually or, if desired, by a remote control push button on the master controller. As now connected, the traction motor field windings 9, 10 and 11 carry current traversing the motor armatures from the overhead line 1 and also field current supplied by the exciter 12 in aiding relation with the current from the source 1. The net current traversing the stabilizing resistor 13 is the difference between the motor armature current and the motor field current from the exciter 12. Acceleration is now continued by moving the tap on the potentiometer 3 gradually toward the top end of the potentiometer by means of the controller 5. As the voltage applied to the traction motors is gradually increased, increased current will flow through the traction motor armatures. However, since the current in the traction motor fields 9, 10 and 11 is primarily determined by the exciter 12 and secondarily by the confluence of armature and field currents in the stabilizing resistor the current in the motor field windings will remain substantially unchanged.

The supplementary excitation connection protects the traction motors against slippage of the driving wheels in the following manner. Should a traction motor armature begin to slip, its generated voltage will immediately increase and tend to overcome the voltage applied from the potentiometer resistor 3. In the anti-slipping connection, however, the increase in generated voltage will be relatively small and consequently the increase in the motor R. P. M. will be relatively small for two reasons. First, the greater part of the change in armature current is accommodated in the stabilizing resistor 13, so that the total current in the traction motor field windings remains substantially constant and independent of the current in the motor armatures. Secondly, the potentiometer connection of the resistor 3, because of its low percentage regulation, does not permit the voltage applied to the motors to increase appreciably as the motor armature current decreases. Since the motor field flux does not decay appreciably, as when slipping occurs in a simple series connection, the motors which are not slipping do not lose their voltage nor is there any appreciable accumulation of voltage upon the armature of the slipping motor. Therefore, only a slight increase in R. P. M. of any slipping motor is sufficient to so reduce the traction motor torque through reduction of armature current that the tendency to slip is reduced to zero.

The anti-slipping connection described immediately above also provides regenerative braking and permits smooth deceleration of the traction motors upon backward movement of the controller 5 to apply a gradually decreasing voltage to the motor circuit.

It will be understood that in the anti-slipping connection, the speed of the traction motors may be varied within limits by changing the voltage of the exciter 12 thereby to vary the motor field current.

After the motors have been fully accelerated in the anti-slip connection of the second position of the controller 4, that is, after the full line voltage is applied to the motors by the controller 5, it is desirable to discontinue the potentiometer connection of the variable resistor 3 in order to prevent loss of power through the resistance. It will be understood, of course, that ordinarily this loss of power is considerable, since for satisfactory anti-slip operation it is necessary to provide a good voltage stability on the various intermediate potentiometer voltage taps. Such stability or low percentage regulation requires a relatively low resistance potentiometer. Disconnection of the potentiometer connection may be accomplished etiher by moving the controller 4 back to its first position and establishing a simple series motor connection, or as will be described hereinafter, by moving the controller 4 to its third position. In transferring from the anti-slip connection of the second position to the simple series connection of the first position on the controller 4, the field of the exciter 12 is first adjusted so that no current is flowing in the stabilizing resistor 13. The switch 13A is then opened. After opening of the switch 13A, the excitation of the exciter 12 is reduced to zero before the controller 4 is moved from its second to its first position. Upon moving the controller 4 to the first position, it will be noted that the contacts 15 are closed thereby to shunt the armature of the exciter 12 before the contacts 16 and 17 are opened to remove the exciter 12 from the motor circuit. The controller contacts 18 are also opened to discontinue the potentiometer connection of the resistor 3.

It is also possible, after acceleration of the traction motors, to derive the benefits of the anti-slip connection without continuing to consume power through the resistor 3 in its potentiometer connection by disconnecting the lower terminal of the resistor 3 from ground but leaving the exciter 12 in the field circuit. This connection is illustrated at the third position of the controller 4, and may advantageously be effected when the traction motors are connected to the highest potential tap of the resistor 3. Since, on the high potential tap of the controller 5, very little or none of the resistor 3 is connected in series circuit relation with the traction motors, and since the power source 1 possesses a satisfactory degree of voltage stability, it will be understood that the anti-slip operation of the motors in the third position of the controller 4 is essentially the same as in the second position of the controller.

It will be understood from the foregoing description that, with the contacts of the controller 4 arranged to operate in the sequence described between the first and second positions of the controller, and with proper control of the field strength of the exciter 12, the motor circuit may be transferred at will between the simple series connection and the anti-slip connection at any point of the accelerating sequence without loss of power. Thus, for example, if acceleration is begun in the first position of the controller 4, transfer to the anti-slip connection may be made during the course of the acceleration by first applying field to the exciter 12 and raising the voltage of the exciter until zero voltage is indicated on the voltmeter 14, then closing the switch 13A, and finally moving the controller 4 from its first to its second position. Acceleration may then be continued in the anti-slip connection. Reverse transfer is accomplished in a similar manner. The intermediate connection of the third position of controller 4 is ordinarily made only with full line voltage applied to the motors.

While I have described only a preferred embodiment of my invention by way of illustration, many modifications will occur to those skilled in the art and I, therefore, wish to have it understood that I intend in the appended claims to cover all such modifications as fall within the true spirit and scope of my invention.

What I claim as new and desire to secure by Letters Patent of the United States is:

1. An electric motor control system comprising a direct current series motor having an armature and a field winding coupled in series circuit relation, a variable voltage source of electric current supply having a low percentage regulation and connected to supply current to said motor, and a separate source of electric current supply for said field winding connected to supply current to said field winding in aiding relation with said variable voltage source.

2. An electric vehicle control system comprising a direct current series traction motor having an armature and a field winding coupled in series circuit relation, a variable voltage source of electric current supply having a low percentage regulation and connected to supply current to said motor, and a field exciting circuit including said field winding and a separate source of electric current supply connected to supply current to said field winding in aiding relation with said variable voltage source.

3. An electric vehicle control system comprising a direct current series traction motor having an armature and a field winding coupled in series circuit relation, a variable potentiometer connected to supply to said motor a stable voltage of selectable intensity, and a separate source of electric current supply for said field winding.

4. An electric traction motor control system comprising a plurality of direct current series traction motors having armatures and field windings connected respectively in series circuit relation, said field windings being coupled to said armatures in series relation, a source of electric current supply for said motors having a low percentage regulation, and a separate source of electric current supply connected to supply current to said field windings in aiding relation with said first supply source.

5. An electric traction motor control system comprising a plurality of direct current series traction motors having armatures and field windings connected respectively in series circuit relation, said field windings being coupled to said armatures in series relation, a source of stable voltage of selectable intensity connected to supply current to said motors, and means including a separate source of electric current supply for maintaining the current in said field windings substantially constant and independent of the voltage supplied to said motors.

6. An electric motor control system comprising a direct current series motor having an armature and a field winding coupled in series circuit relation, a source of electric current supply for said motor having a low percentage regulation, and additional field excitation means comprising a separate source of electric current supply connected to said field winding through a stabilizing resistor.

7. An electric traction motor control system comprising a plurality of direct current series traction motors having armatures and field windings connected respectively in series circuit relation, said field windings being coupled to said armatures in series relation, a first source of electric current supply for said motors having a low percentage regulation, and additional excitation means for said field windings comprising a second source of electric current supply connected in series circuit relation with said motors across said first supply source and a resistor connected across said field windings and said second supply source.

8. An electric motor control system comprising a plurality of direct current series motors having armatures and field windings connected respectively in series circuit relation, said field windings being coupled to said armatures in series relation, a first source of electric current supply for said motors having a low percentage regulation, and a second source of electric current supply connected to said field windings through a stabilizing resistor.

9. An electric motor control system comprising a direct current series motor having an armature and a field winding coupled in series circuit relation, a source of electric current supply for said motor having a low percentage regulation, and a separate source of electric current supply connected to said field winding through a stabilizing resistor having a resistance less than the resistance of said field winding.

10. An electric traction motor control system comprising a plurality of direct current series traction motors having armatures and field windings connected respectively in series circuit relation, a variable voltage source of electric current supply having a low percentage regulation and connected to supply current to said armatures and field windings in series relation, and a separate source of electric current supply connected to said field windings through a stabilizing resistor having a resistance less than the sum of the resistances of said series field windings.

11. An electric motor control system comprising a direct current series motor having an armature and a field winding coupled in series circuit relation, a variable resistor, a source of substantially constant potential, means for selectably connecting said motor to said source either in series or parallel circuit relation with said resistor, and a separate source of electric current supply for said field winding.

12. An electric motor control system comprising a direct current series motor having an armature and a field winding coupled in series circuit relation, a variable resistor, a source of substantially constant potential, means for selectably connecting said motor to said source either in series or potentiometer circuit relation with said resistor, and a separate source of electric current supply connected through a stabilizing resistor to supply current to said field winding in aiding relation with current from said constant potential source.

13. An electric vehicle control system comprising a plurality of direct current series traction motors having armatures and field windings connected respectively in series circuit relation, a variable resistor, a source of substantially constant potential, means for selectably connecting said motors to said source of potential either in series or potentiometer circuit relation with said resistor, and additional field exciting means comprising a source of electric current supply connected in series with said field windings across said source of potential and in opposing relation thereto and a stabilizing resistor connected across said field windings and said current supply source.

14. An electric vehicle control system comprising a plurality of direct current series traction motors having armatures and field windings connected respectively in series circuit relation, a variable resistor, a source of substantially constant voltage electric current supply, means for selectably connecting said motors to said constant voltage supply source in series or potentiometer circuit relation with said resistor, and a variable voltage source of electric current supply connected through a stabilizing resistor having a resistance appreciably smaller than the sum of the resistances of said series field windings to supply current to said field windings in aiding relation to current from said constant voltage source.

15. An electric vehicle control system comprising a plurality of direct current series traction motors having armatures and series field windings connected respectively in series circuit relation, a variable resistor, a source of substantially constant voltage electric current supply, switching means for selectably connecting said motors to said constant voltage supply source either in series or potentiometer circuit relation with said resistor, a variable voltage source of electric current supply connected to said series field windings through a stabilizing resistor, and second switching means for disconnecting said stabilizing resistor and said separate source from said series field windings.

16. An electric vehicle control system comprising a plurality of direct current series traction motors having armatures and series field windings connected respectively in series circuit relation, a substantially constant voltage source of electric current supply, a variable resistor, first switching means for connecting said motors to said constant voltage supply source in potentiometer circuit relation with said resistor, said resistor in said potentiometer relation having a low percentage regulation, a supplementary field excitation circuit comprising a variable voltage source of electric current supply connected through a stabilizing resistor to supply current to said series field windings in aiding relation with the current through said armatures, said stabilizing resistor having a resistance less than the sum of the resistances of said field windings, and second switching means for disabling said supplementary field excitation circuit and connecting said motors across said constant voltage supply source in series with said variable resistor.

17. An electric motor control system comprising a direct current series motor having an armature and a series field winding coupled in series circuit relation, a source of electric supply for said motor having a low percentage regulation, a stabilizing resistor having a resistance less than the resistance of said series field winding, and a separate source of variable voltage electric current supply connected to said series field winding through said stabilizing resistor.

HAROLD S. OGDEN.